(12) United States Patent
Sanguino et al.

(10) Patent No.: US 7,813,762 B2
(45) Date of Patent: Oct. 12, 2010

(54) WIRELESS COMMUNICATIONS ADAPTER FOR A HEARING ASSISTANCE DEVICE

(75) Inventors: Jorge Sanguino, Minneapolis, MN (US); Randall W. Roberts, Eden Prairie, MN (US)

(73) Assignee: Micro Ear Technology, Inc., Plymouth, MN (US)

( * ) Notice: Subject to any disclaimer, the term of this patent is extended or adjusted under 35 U.S.C. 154(b) by 482 days.

(21) Appl. No.: 11/207,591

(22) Filed: Aug. 18, 2005

(65) Prior Publication Data

US 2006/0068842 A1  Mar. 30, 2006

Related U.S. Application Data

(60) Provisional application No. 60/602,496, filed on Aug. 18, 2004.

(51) Int. Cl.
*H04B 1/38* (2006.01)
*H04R 25/00* (2006.01)

(52) U.S. Cl. .................. 455/557; 361/323; 361/314

(58) Field of Classification Search ............. 455/41.2, 455/426.1, 557, 569.1, 575.1, 575.2, 90.2; 381/312, 315, 322, 323, 330
See application file for complete search history.

(56) References Cited

U.S. PATENT DOCUMENTS

| | | | |
|---|---|---|---|
| 3,742,359 | A | 6/1973 | Behymer |
| 5,157,405 | A | 10/1992 | Wycoff et al. |
| 5,204,917 | A | 4/1993 | Arndt et al. |
| 5,426,689 | A | 6/1995 | Griffith et al. |
| 5,721,783 | A | 2/1998 | Anderson |
| 5,761,319 | A | 6/1998 | Dar et al. |
| 5,793,875 | A | 8/1998 | Lehr et al. |
| 6,078,825 | A | 6/2000 | Hahn et al. |
| 6,144,748 | A | 11/2000 | Kerns |
| 6,157,728 | A | 12/2000 | Tong et al. |
| 6,230,029 | B1 | 5/2001 | Hahn et al. |
| 6,381,308 | B1 | 4/2002 | Cargo et al. |
| 6,760,457 | B1 | 7/2004 | Bren et al. |
| 7,099,486 | B2 | 8/2006 | Julstrom et al. |
| 7,139,404 | B2 | 11/2006 | Feeley et al. |
| 7,142,814 | B2 | 11/2006 | Nassimi |

(Continued)

FOREIGN PATENT DOCUMENTS

CH  673551  3/1990

(Continued)

OTHER PUBLICATIONS

"Hearing Aids—Part 12: Dimensions of Electrical Connector Systems", IEC 118-12, (1996), 21 pages.*

(Continued)

*Primary Examiner*—Blane J Jackson
(74) *Attorney, Agent, or Firm*—Schwegman, Lundberg & Woessner, P.A.

(57) ABSTRACT

A wireless communications adapter adapted for connection to a direct audio input of a hearing assistance device, the wireless communications adapter adapted for radio frequency communications with a remote device. Varying embodiments enable communication using a protocol compatible with a BLUETOOTH standard to reach a hearing assistance device through a direct audio input. Some examples of the wireless communication adapter offer microphone options to receive audio information and transmit it with far field communications.

20 Claims, 11 Drawing Sheets

U.S. PATENT DOCUMENTS

| | | |
|---|---|---|
| 7,149,552 B2 | 12/2006 | Lair |
| 7,181,032 B2* | 2/2007 | Jakob et al. ............... 381/314 |
| 7,257,372 B2* | 8/2007 | Kaltenbach et al. ........ 455/41.2 |
| 7,450,078 B2 | 11/2008 | Knudsen et al. |
| 2001/0007335 A1 | 7/2001 | Tuttle et al. |
| 2002/0090099 A1 | 7/2002 | Hwang |
| 2002/0131614 A1 | 9/2002 | Jakob et al. |
| 2002/0132585 A1 | 9/2002 | Palermo et al. |
| 2003/0045283 A1* | 3/2003 | Hagedoorn ............... 455/426 |
| 2003/0078071 A1 | 4/2003 | Uchiyama |
| 2003/0133582 A1 | 7/2003 | Niederdrank |
| 2003/0231783 A1 | 12/2003 | Kah |
| 2004/0010181 A1 | 1/2004 | Feeley et al. |
| 2004/0077387 A1 | 4/2004 | Sayag et al. |
| 2004/0136555 A1* | 7/2004 | Enzmann ................... 381/314 |
| 2004/0141628 A1* | 7/2004 | Villaverde et al. .......... 381/381 |
| 2004/0208333 A1 | 10/2004 | Cheung et al. |
| 2005/0008178 A1* | 1/2005 | Joergensen et al. ......... 381/322 |
| 2005/0078844 A1 | 4/2005 | Von |
| 2005/0099341 A1 | 5/2005 | Zhang et al. |
| 2005/0249371 A1 | 11/2005 | Vogt |
| 2006/0039577 A1 | 2/2006 | Sanguino et al. |
| 2006/0044140 A1 | 3/2006 | Berg |
| 2006/0057973 A1 | 3/2006 | Wikel et al. |
| 2006/0193375 A1 | 8/2006 | Lee |
| 2006/0245611 A1* | 11/2006 | Jorgensen et al. ........... 381/323 |
| 2007/0004464 A1 | 1/2007 | Lair et al. |
| 2007/0080889 A1 | 4/2007 | Zhang |
| 2007/0230727 A1 | 10/2007 | Sanguino et al. |
| 2008/0232623 A1 | 9/2008 | Solum et al. |

FOREIGN PATENT DOCUMENTS

| | | |
|---|---|---|
| EP | 0789474 A2 | 8/1997 |
| JP | 10084209 | 3/1998 |
| WO | WO-2006023857 A1 | 3/2006 |
| WO | WO-2006023920 A1 | 3/2006 |

OTHER PUBLICATIONS

"International Application Serial No. PCT/US2005/029793, International Preliminary Report on Patentability mailed Mar. 1, 2007", 5 pgs.

"International Application Serial No. PCT/US2005/029793, International Search Report mailed Jan. 5, 2006", 7 pgs.

"International Application Serial No. PCT/US2005/029793, Written Opinion mailed Jan. 5, 2006", 4 pgs.

"International Application Serial No. PCT/US2005/029971, International Preliminary Report on Patentability mailed Mar. 1, 2007", 6 pgs.

"International Application Serial No. PCT/US2005/029971, International Search Report mailed Jan. 5, 2006", 7 pgs.

"International Application Serial No. PCT/US2005/029971, Written Opinion mailed Jan. 5, 2006", 4 pgs.

Haartsen, J., "Bluetooth-The Universal Radio Interface for Ad Hoc, Wireless Conncetivity", *Ericsson Review*, No. 3, (1998),110-117.

Preves, D. A., "A Look at the Telecoil—It's Development and Potential", *SHHH Journal*, (Sep./Oct. 1994),7-10.

"U.S. Appl. No. 11/207,555 Reponse filed Jun. 22, 2009 to Final Office Action mailed Jan. 22, 2009", 9 pgs.

"European Application Serial No. 05790836.0, Office Action Mailed Jun. 4, 2009", 3 pgs.

"Hearing Aids—Part 12: Dimensions of electrical connector systems", *IEC 118-12*, (1996), 21 pgs.

"Hearing Aids—Part 6: Characteristics of electrical input circuits for hearing aids", *IEC 60118-6*, (1999), 12 pgs.

Haartsen, J., "Bluetooth—TheUniversal Radio Interface for Ad Hoc, Wireless Connectivity", *Ericsson Review (INCL ON), Ericsson, Stockholm, SE*, No. (3), XP000783249, ISSN:0014-0171, (1998), 110-117.

Valente, Michael, et al., "Audiology: Treatment", *Thieme Medical Publishers*, (Mar. 1, 2000), 594-599.

U.S. Appl. No. 11/207,555: Non-Final Office Action mailed Jun. 3, 2008, 14 Pgs.

"U.S. Appl. No. 11/207,555, Non-Final Office Action mailed Jul. 16, 2009", 12 pgs.

"U.S. Appl. No. 11/207,555, Response filed Nov. 3, 2008 to Non Final Office Action mailed Jun. 3, 2008", 8 pgs.

"U.S. Appl. No. 11/207,555, Final Office Action mailed Jan. 22, 2009", 17 pgs.

U.S. Appl. No. 11/207,555, Final Office Action mailed Feb. 4, 2010, 13 pgs.

U.S. Appl. No. 11/207,555, Response filed Nov. 16, 2009 to Non-Final Office Action mailed Jul. 6, 2009, 8 pgs.

U.S. Appl. No. 11/692,763, Non-Final Office Action mailed Jan. 21, 2010, 11 pgs.

* cited by examiner

US 7,813,762 B2

WIRELESS COMMUNICATIONS ADAPTER FOR A HEARING ASSISTANCE DEVICE

CLAIM OF BENEFIT

This application claims the benefit of U.S. Provisional Patent Application Ser. No. 60/602,496, filed Aug. 18, 2004, which is hereby incorporated by reference in its entirety.

FIELD OF THE INVENTION

This application relates generally to wireless communications for hearing assistance devices, and more particularly to an adapter for connection to hearing assistance devices for providing wireless communications with remote devices.

BACKGROUND

Portable self-powered hearing assistance devices have been developed to provide sound conditioning. A popular use for hearing assistance devices is to provide assistance for hearing loss or impairment. Such devices are highly programmable and extremely compact. However, difficulties in connections to provide communications to such devices are common. There is a need in the art for improved communications systems with compact hearing assistance devices. Such systems should be designed to be elegant and employ existing standards where possible.

SUMMARY

The above-mentioned problems and others not expressly discussed herein are addressed by the present subject matter and will be understood by reading and studying this specification.

The present teachings include apparatus and method for use with a hearing assistance device having a direct audio input connector. In varying examples, the apparatus includes a wireless communications adapter situated in a housing including a connector adapted to electrically connect to the direct audio input connector of a hearing assistance device. The wireless communications adapter supports radio frequency communications, including, but not limited to far field communications with a remote device. Unidirectional and bidirectional communications are contemplated. Various communication protocols are contemplated, including, but not limited to BLUETOOTH communication protocols. Also, in varying embodiments the housing is adapted to mechanically connect with the hearing assistance device.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof. The scope of the present invention is defined by the appended claims and their legal equivalents.

BRIEF DESCRIPTION OF THE DRAWINGS

Various embodiments are illustrated by way of example in the figures of the accompanying drawings.

DETAILED DESCRIPTION

The following detailed description of the present invention refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Figure 1A:
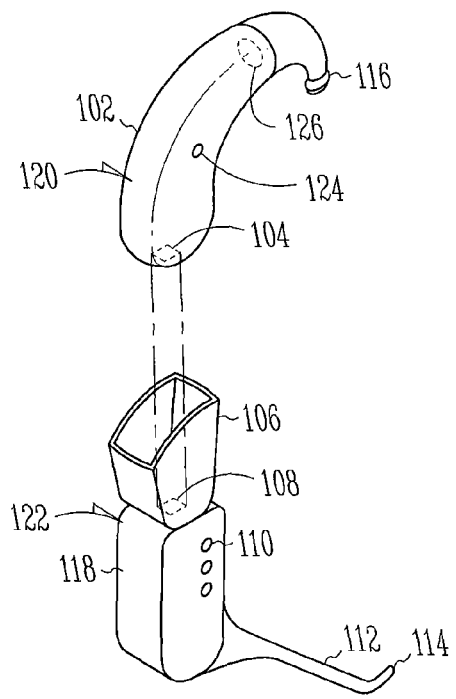
FIG. 1A illustrates a perspective view of a connected hearing assistance device and wireless communications adapter, according to one embodiment of the present subject matter.
Figure 1B:
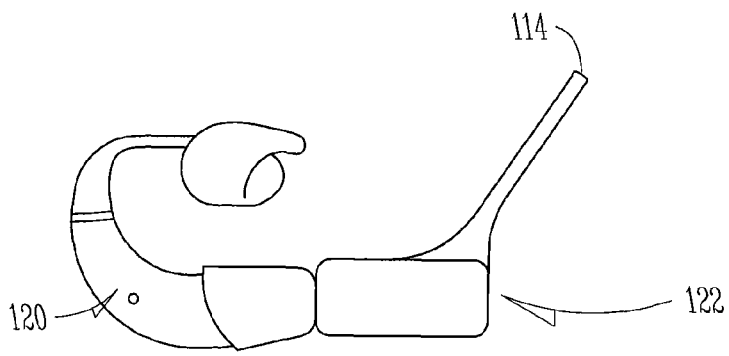
FIG. 1B illustrates a perspective view of a disconnected hearing assistance device and wireless communications adapter, according to one embodiment of the present subject matter.
Figure 1C:
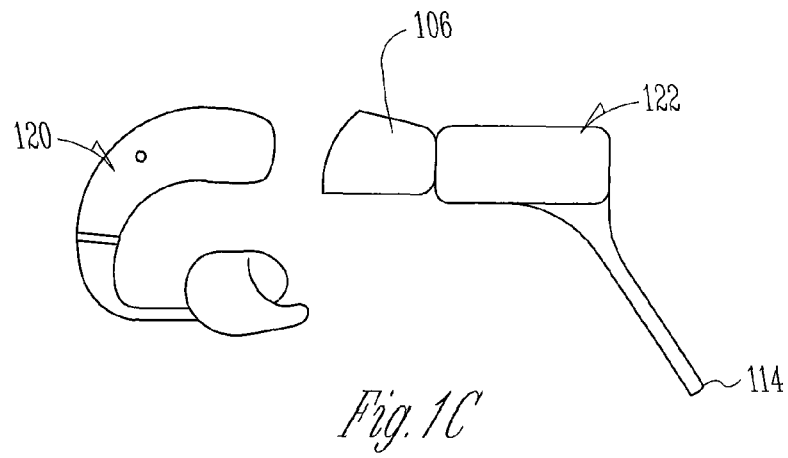
FIG. 1C illustrates a perspective view of a disconnected hearing assistance device and wireless communications adapter, according to one embodiment of the present subject matter.

FIGS. 1A-1C illustrate perspective views of a hearing assistance device 120 and wireless communications adapter 122, according to one embodiment of the present subject matter. The wireless communications adapter 122 is designed to connect to the hearing assistance device 120. In varying embodiments, a system for communicating wirelessly using an existing hearing assistance device 120 includes a hearing assistance device housing 102 sized for mating with a human ear, the mass of the hearing assistance device 120 supportable by the human ear. In one example, the hearing assistance device housing 102 is a self-powered behind-the-ear hearing assistance device. In the example, the hearing assistance device housing 102 includes hearing assistance device electronics, a hearing assistance device speaker 126, a hearing assistance device port 116 for transmitting sound to an earpiece, a hearing assistance device microphone 124 and a hearing assistance device connector 104.

The connector 104 provides for a wired connection in varying examples. In one embodiment, the connector 104 includes pads, such as gold plated metallic pads, suitable for forming multiple connections with terminals, such as spring-loaded pin-shaped terminals. However, in additional examples, the hearing assistance device connector 104 includes a mechanical lock. In various embodiments, the mechanical lock is releasable. In one example, the mechanical lock is constructed to support the weight of a mating connector and its associated components.

In one embodiment, the hearing assistance device connector 104 is a Direct Audio Input (DAI) type connector 104. In some varying designs, a connector is formed to mate with the DAI connector which includes a "boot" that surrounds at least a portion of the DAI connector. In embodiments involving behind-the-ear hearing aids, the boot may also mechanically interface with the lower portion of the behind-the-ear hearing aid proximal the DAI connector. In varying embodiments the boot includes silicon or plastic. Such embodiments can be adapted to support at least some or all of the weight of the components attached to the boot. In various embodiments, the boot serves to improve comfort. The Direct Audio Input, in varying embodiments, is connected to hearing assistance device electronics which can control varying aspects of hearing assistance device function.

Mateable to the hearing assistance device 120 is a wireless communications adapter 122. In varying embodiments, the wireless communications adapter 122 includes a wireless communications adapter connector 108 and a boot 106 which forms a mechanical connection with the hearing assistance device housing 102. In varying embodiments, the boot 106 and the connector 108 form components typical of DAI connector sets, however, the present subject matter is not limited to these variants. In varying examples, connector 108 combined with the boot 106 is suited to use fricative cohesion, adhesives, elastic deformation of the boot, or any combination of these to form a mechanical connection with the hearing assistance device 120, with or without the assistance of the hearing assistance device connector 104. Although many embodiments use the boot 106, others do not, and, in general, the examples listed here should not be understood to be exhaustive or exclusive. Another embodiment without a boot will be demonstrated by FIG. 5A and its related figures and description provided below.

The wireless communications adapter 122 includes a wireless communications adapter housing 118, in varying examples, which contains wireless communications adapter electronics. In varying embodiments, the electronics operate independent of notification to a user, but some embodiments communicate information to the user using visual indicators 110, or other types of indicators. Additionally, some embodiments of the wireless communications adapter include a boom 112 and a wireless communications adapter microphone 114, the boom 112 extending away from the wireless communications adapter housing 118 to a distal end, the wireless communications adapter microphone 114 located at the distal end of the boom 112.

Figure 2:
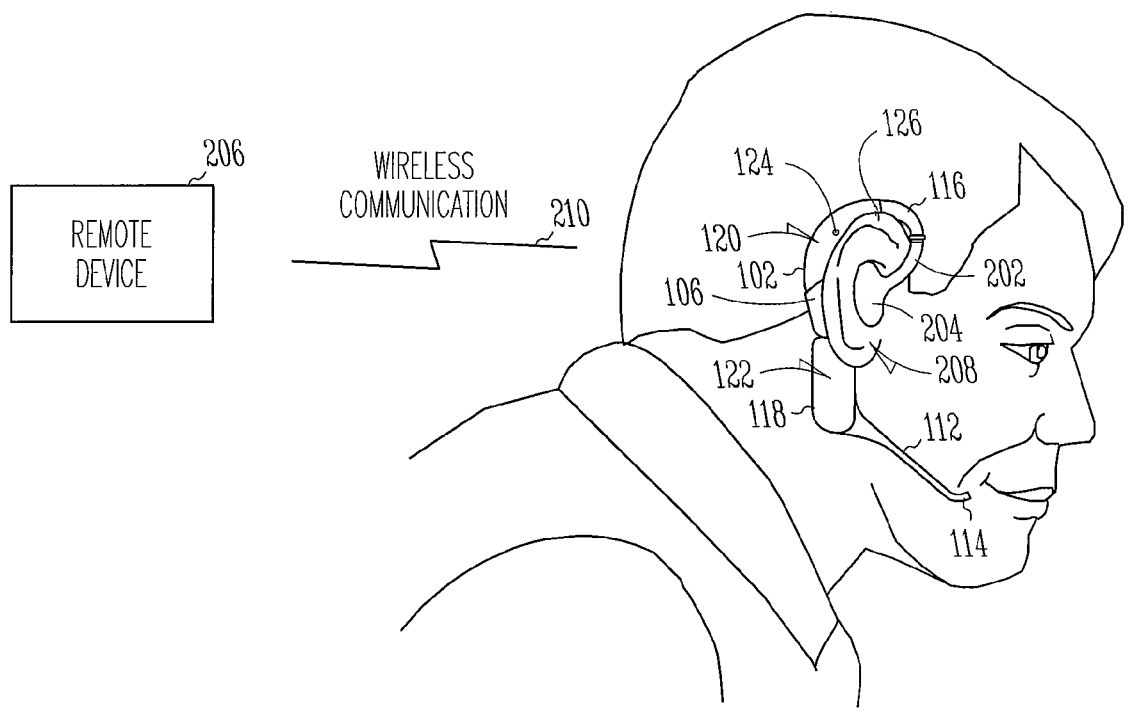
FIG. 2 illustrates a block diagram of a wireless communication system, according to one embodiment of the present subject matter.

FIG. 2 illustrates a block diagram of a wireless communication system, according to one embodiment of the present subject matter. FIG. 2 illustrates the hearing assistance device 120 connected to the wireless communications adapter 122, and further illustrates a connected hearing assistance device 120 and wireless communications adapter 122 mounted on an ear 208 of a user. In varying designs, the wireless communications adapter 122 and hearing assistance device 120 are sized for comfortable use on an ear 208, including aspects which restrict the mass of the apparatus. The illustration also demonstrates one embodiment of a tube 202 for conducting sound to an earpiece 204, the earpiece custom fitted to the user, which, in varying examples, allows for a standardized hearing assistance device 120. Other earpieces, such as vented designs, are contemplated without departing from the scope of the present subject matter.

The combined hearing assistance device 120 and wireless communications adapter 122 can communicate information 210 between the hearing assistance device 120 and a remote device 206. A variety of remote devices 206 can be employed. In one example, the remote device 206 is a cellular telephone capable of conducting BLUETOOTH compatible wireless communications. Other communications standards may be employed without departing from the scope of the present subject matter. Other types of communications are possible without departing from the scope of the present subject matter. Varying combinations of communications and communications standards may be employed without departing from the scope of the present subject matter.

In one embodiment, the wireless communications adapter is suited to communicate in far-field networks with one or more remote devices 206. Various remote devices 206 can be employed separately or in combination.

Figure 3A:
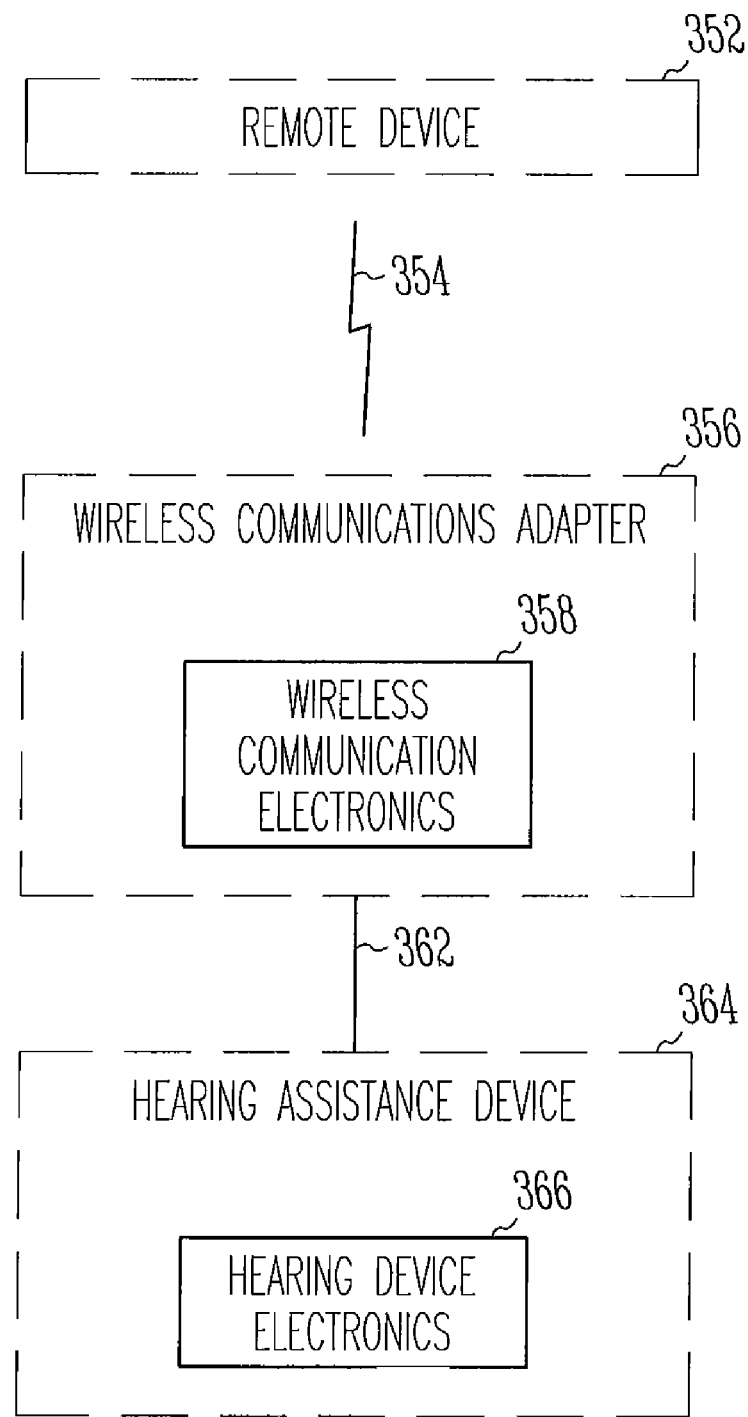
FIG. 3A illustrates a block diagrams for a wireless communications adapter and hearing assistance device, according to one embodiment of the present subject matter.

FIG. 3A illustrates a block diagram for a wireless communications adapter 356 and hearing assistance device 364, according to one embodiment of the present subject matter. In varying embodiments, the system includes a hearing assistance device 364 and electronics 366 connected to a wireless communications adapter 356. The connection 362 between the wireless communications adapter 356 and the hearing assistance device 364 is capable of relaying signals.

The wireless communications adapter includes, in some embodiments, wireless communication electronics 358 adapted for producing wireless communications 354 with a remote device 352. Wireless communications include electromagnetic communications, including far-field communications carrying digital signals. In one example, the wireless communication electronics 358 are adapted to provide BLUETOOTH communication with a remote, or with multiple remote devices.

Figure 3B:
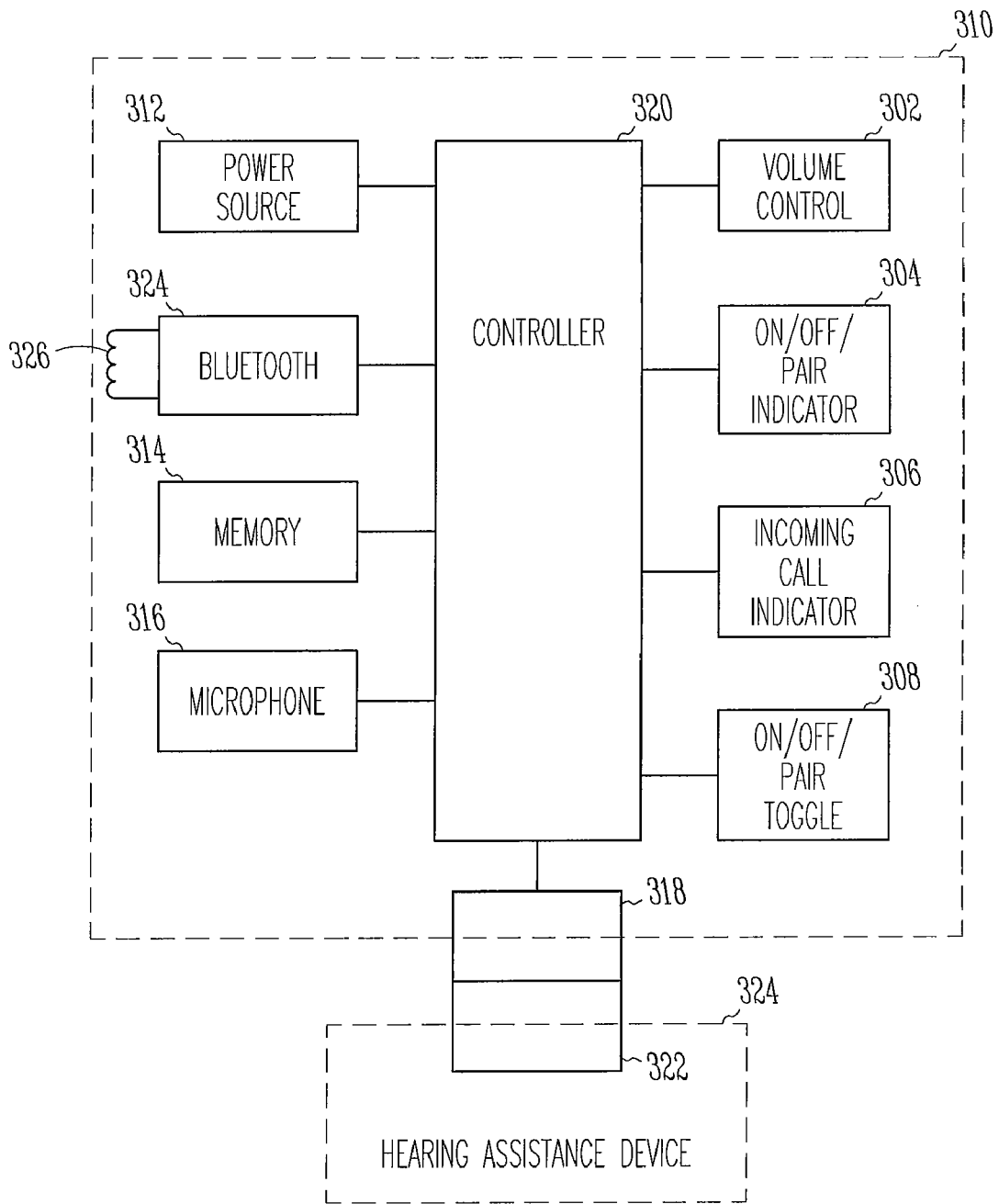
FIG. 3B illustrates a block diagrams for a wireless communications adapter and hearing assistance device, according to one embodiment of the present subject matter.

FIG. 3B illustrates a block diagram for a wireless communications adapter 310 and hearing assistance device 324, according to one embodiment of the present subject matter. In varying embodiments, the wireless communications adapter 310 includes a controller 320 which is adapted to control varying components within the wireless communications adapter 310. Additionally, the system includes a hearing assistance device 324, connected to the wireless communications adapter through the mated wireless communications adapter connector 318 and hearing assistance device connector 322.

In varying designs, the wireless communications adapter 310 includes a component 324 for producing wireless communications compatible with a BLUETOOTH network. In some examples, the BLUETOOTH wireless communicator includes an antenna 326 for use in wireless communications. In varying examples the antenna is part of a circuit board to which other components are mounted. In an additional embodiment, the wireless communications adapter includes an elongate microphone boom extending from the BLUETOOTH component 324, and the antenna 326 extends from the BLUETOOTH component into the microphone boom.

The wireless communications adapter 310, in varying examples, includes a power source. The power source, in varying embodiments, is a battery, such as a Lithium-ion Polymer battery.

In varying designs, the wireless communications adapter includes a volume control 302. In varying embodiments, gain for other components can also be controlled.

The wireless communications adapter consumes power, and varying designs benefit from components which indicate power remaining in a power source. For example, by including indicators 304, one design can inform a user how much power is remaining.

Additionally, varying embodiment include indicators representing other functional states. One example includes a multi-color LED which indicates that the BLUETOOTH transmitter 324 is powered, and an additional example indicates whether the BLUETOOTH transmitter 324 has been paired with another BLUETOOTH device.

Likewise, varying examples include components for representing the presence of data in the far field network. One example includes components for indicating that a call is pending, requiring a hearing assistance device user to decide if they should respond to the incoming call. In one design, the incoming call indicator includes an LED to for indicating that a call is incoming.

Varying designs require pairing the wireless communications adapter 310 with other devices. BLUETOOTH networks, for example, provide for the pairing of a plurality of devices. Some designs use a master device and a slave device, the master device serving to awake the slave device in instances where communication occurs. In varying designs, pairing can be facilitated by one or more push buttons. In one design, a button is located on the wireless communications adapter 310.

Information such as volume, pairing, and other information, can be stored in a memory 314. In varying embodiments, the memory is useful to store operational parameters, such as volume and status. In varying embodiments, the memory 314 is useful for storing application data. Application data may include, but is not limited to, processing instructions, communications instructions, and multimedia processing instructions.

Controller 320 facilitates interoperability of the wireless communications adapter components. Controller 320 also is capable of interfacing with microphone electronics which can be used to receive audio signals for use with a hearing assistance device. Such audio signals may also be transmitted wirelessly to another device. In one application, the audio signals are speech from the wearer of the device, which can be relayed by the wireless electronics to another device. Such a system is highly programmable, depending on the application and particular hearing assistance devices employed. It is understood that there are some embodiments which may not include microphone 316.

Figure 4:
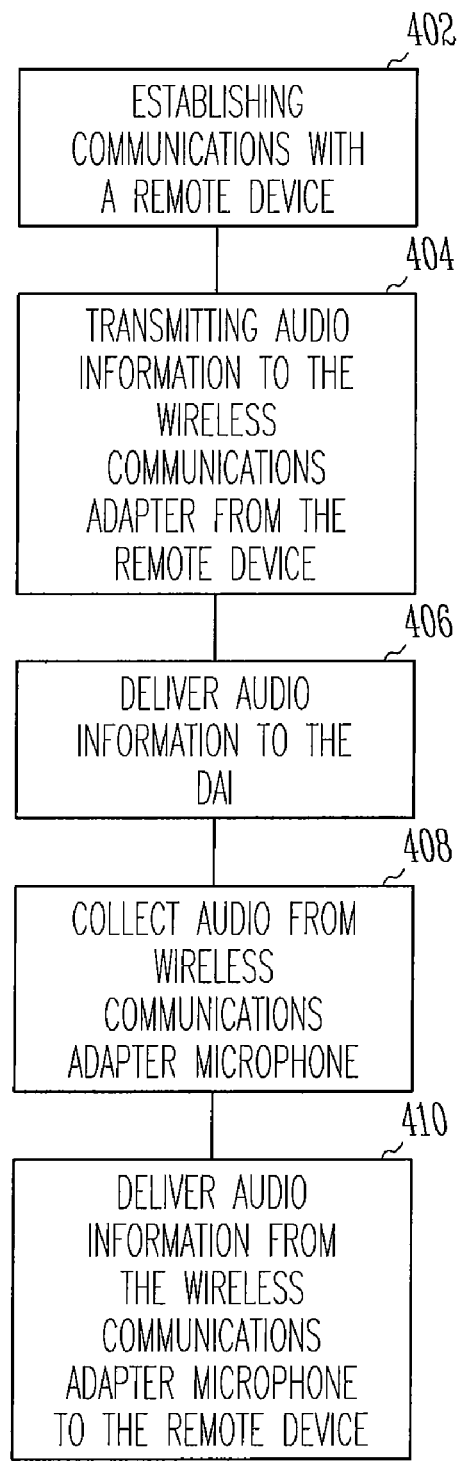
FIG. 4 illustrates a flowchart for operation of a wireless communications adapter used to relay wireless communication, according to one embodiment of the present subject matter.

FIG. 4 illustrates a flowchart for operation of a wireless communications adapter used for wireless communication, according to one embodiment of the present subject matter. In one embodiment, at 402 the wireless communications adapter establishes communications with a remote device. The remote device transmits audio information to the wireless communications adapter (404), which is then delivered to the DAI (406). At 408, in embodiments including a microphone, audio from the microphone will be transmitted by the wireless communications adapter to the remote device (408). Such communications are optional and may bypass the hearing assistance device and travel to the remote device (410). It should be noted that varying communications and combinations are possible without departing from the present teachings.

Figure 5A:
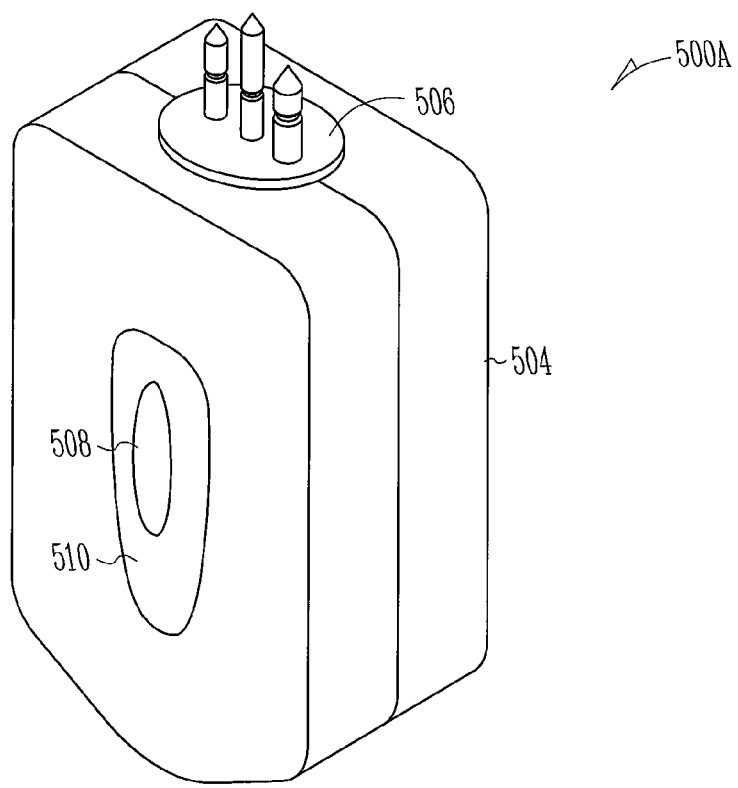
FIG. 5A illustrates a perspective view of one embodiment of a wireless communications adapter, according to one embodiment of the present subject matter.
Figure 5B:
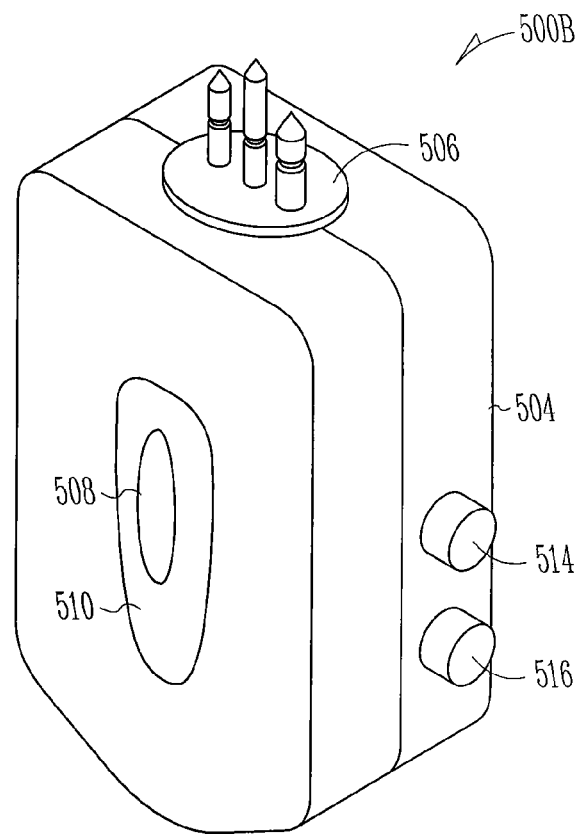
FIG. 5B illustrates a perspective view of one embodiment of a wireless communications adapter, according to one embodiment of the present subject matter.

FIG. 5A illustrates a perspective view of one embodiment of a wireless communications adapter, according to one embodiment of the present subject matter. In one embodiment, the wireless communications adapter 500A includes a DAI connector 506. In some embodiments, the connector 506 may be adjustable so that it can swivel to position the wireless communications adapter 500A at different angles to the device connected to connector 506. In various embodiments, the wireless communication adapter 500A includes a housing 504 including one or more buttons 510 to perform functions. The wireless communication adapter 500A, in various embodiments, also includes one or more indicators 508 to indicate aspects of the operation of the device. Placement and types of buttons and indicators may vary without departing from the scope of the present subject matter. FIG. 5B illustrates another variation of a wireless communications adapter 500B including the aspects set forth for wireless communications adapter 500A and including an optional volume control 514 and an optional power port 516. The position and types of volume control 514 and power port 516 may vary without departing from the scope of the present subject matter.

Thus, the wireless communications adapter may be embodied in several designs having varying form factors and features without departing from the scope of the present subject matter.

Figure 6A:
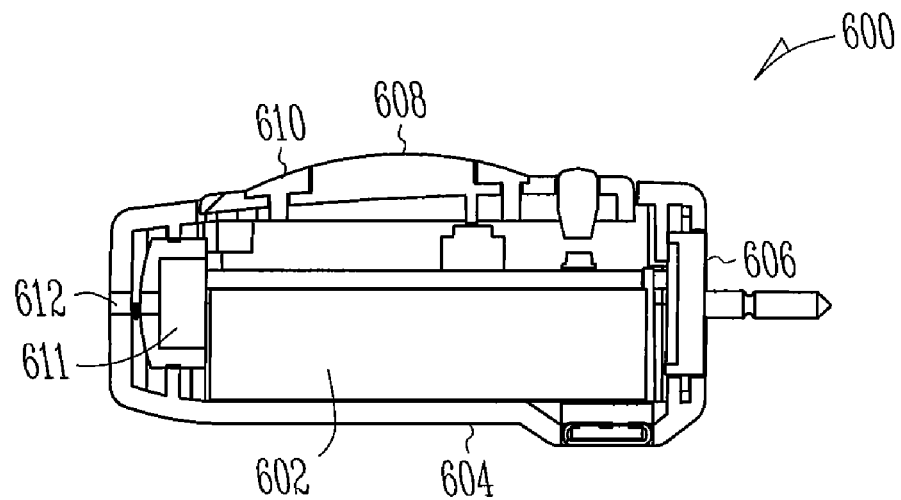
FIG. 6A is a cross sectional view of one embodiment of a wireless communications adapter, according to one embodiment of the present subject matter.
Figure 6B:
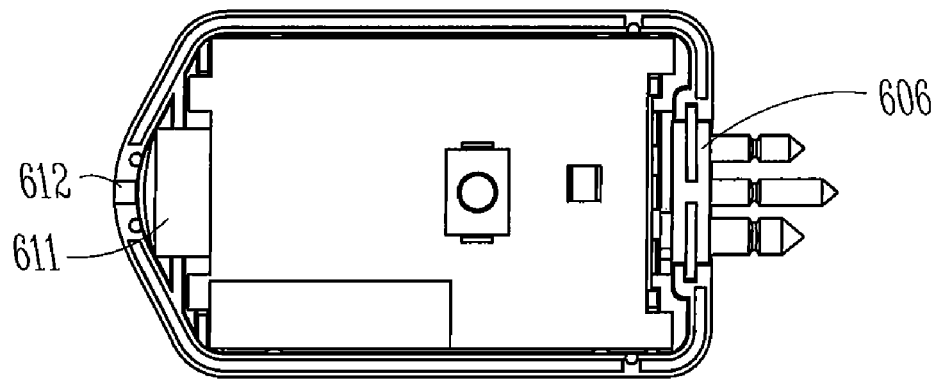
FIG. 6B is a cross sectional view of one embodiment of a wireless communications adapter, according to one embodiment of the present subject matter.

FIG. 6A is a cross sectional view of one embodiment of a wireless communications adapter, according to one embodiment of the present subject matter. The cross section of wireless communications adapter 600 shown in FIG. 6A provides housing 604 for housing a battery 602 and a microphone 611. The microphone hole 612 allows sound to reach the microphone 611. Indicator 608 is optionally connected to button 610 which is accommodated by housing 604. Connector 606 is also accommodated by housing 604. Other electronics can be included within the housing as exemplified by FIG. 3B. FIG. 6B is another cross sectional view of one embodiment of a wireless communications adapter, according to one embodiment of the present subject matter. FIG. 6B shows placement of microphone 611, microphone hole 612, and connector 606 according to one embodiment of the present subject matter. Other configurations and shapes and subcomponents are possible without departing from the scope of the present subject matter. Some embodiments may exist which do not include a microphone. Although a DAI connector is demonstrated, it is understood that other connectors can be employed in various embodiments of the present subject matter.

Figure 9:
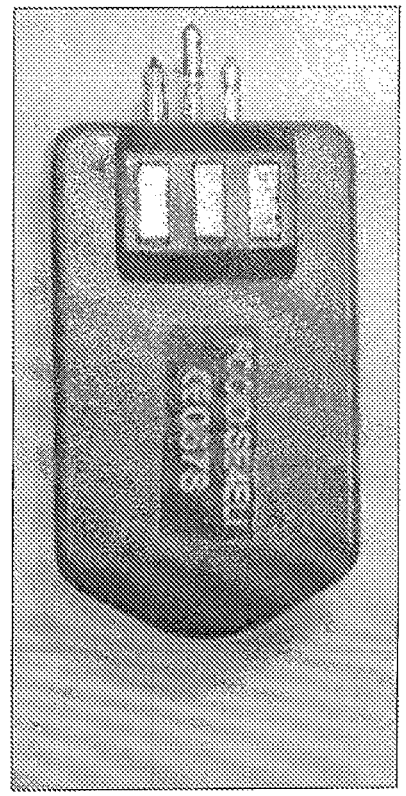
FIG. 9 shows a back view of one example of a wireless communications adapter according to one embodiment of the present subject matter.

In various embodiments of the present wireless communications adapter, the battery is rechargeable. In such embodiments, the wireless communications adapter can include contacts for charging. One example of such contacts are shown in FIG. 9. In some embodiments, the wireless communications adapter includes an optional charging port. Other arrangements are possible for charging which are within the scope of the present subject matter.

Figure 7A:
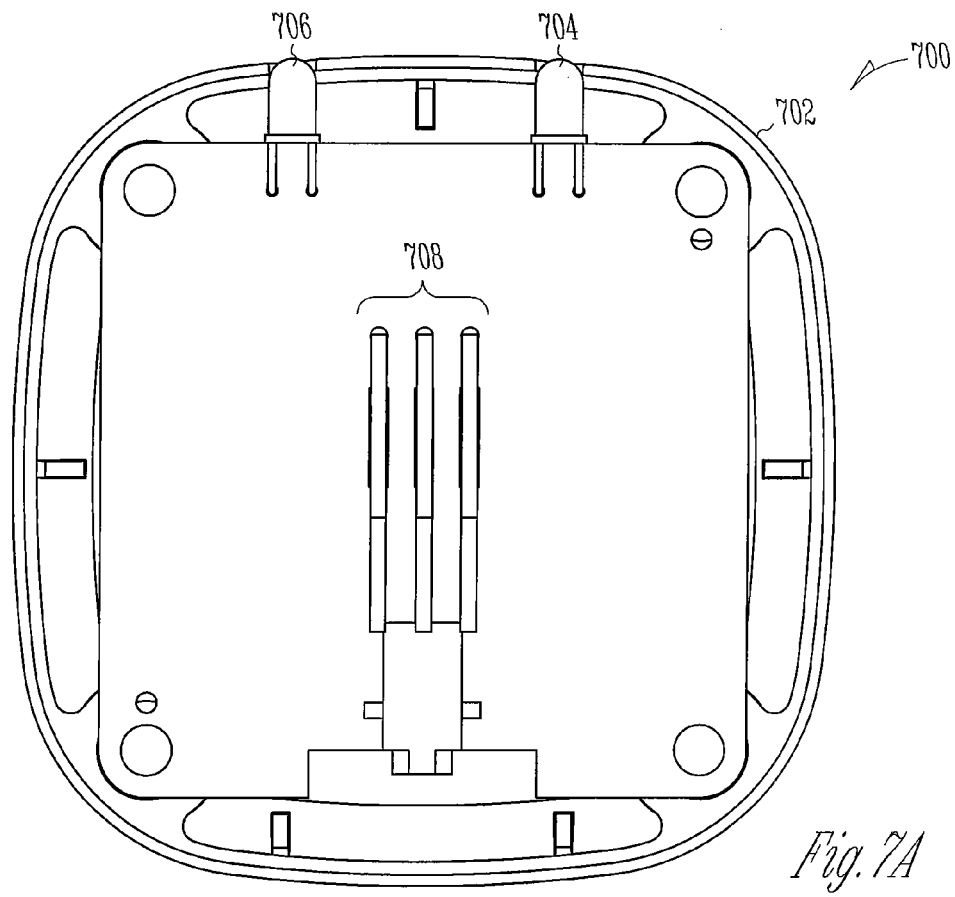
FIG. 7A is a cross sectional view of one embodiment of a charger for a wireless communications adapter, according to one embodiment of the present subject matter.
Figure 7B:
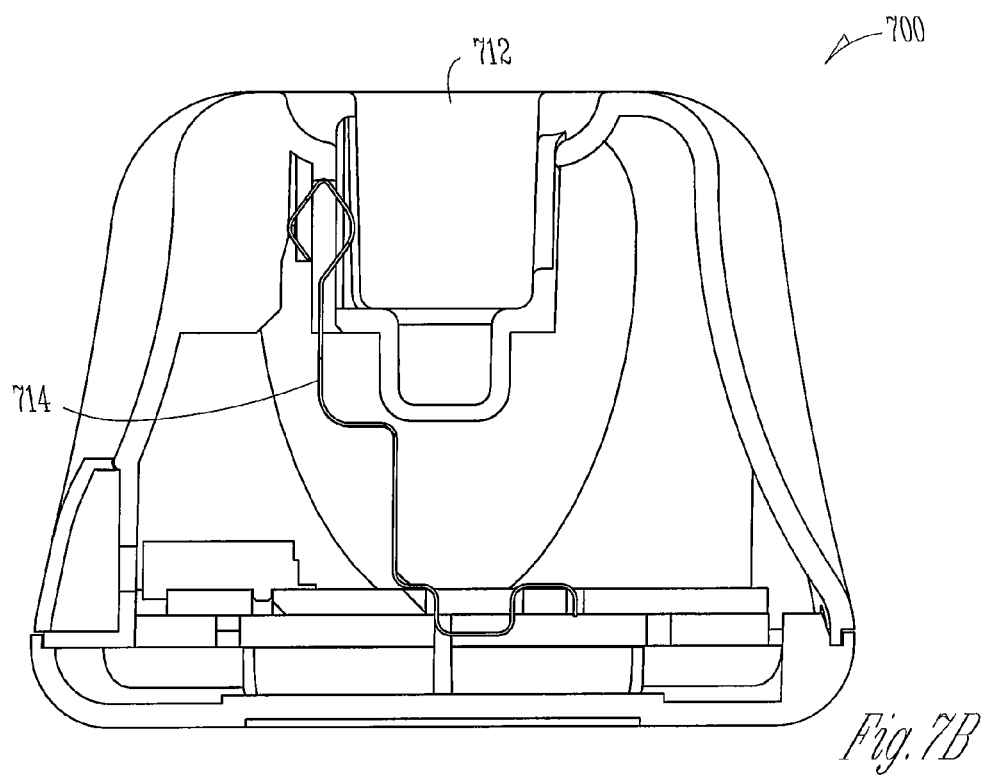
FIG. 7B is a cross sectional view of one embodiment of a charger for a wireless communications adapter, according to one embodiment of the present subject matter.

FIG. 7A is a cross sectional view of one embodiment of a charger for a wireless communications adapter, according to one embodiment of the present subject matter. Charger 700 includes LEDs 704 and 706 to indicate status concerning the charging of the device. Contacts 708 receive power for charging from a power supply. One approach is the use of a transformer and wall plugin which is fed to the charger 700. FIG. 7B is a cross sectional view of one embodiment of a charger for a wireless communications adapter, according to one embodiment of the present subject matter. Contacts 714 are adapted to receive current from a power source plugged into charger 700 and provide them to a device inserted into opening 712 which as adapted to receive the device and bias contacts of the device against the contacts 714. Other configurations are possible without departing from the scope of the present subject matter.

Figure 8:
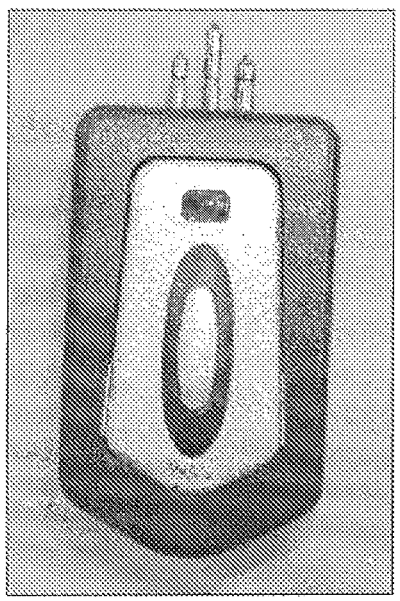
FIG. 8 shows a front view of one example of a wireless communications adapter according to one embodiment of the present subject matter.

FIG. 8 shows a front view of one example of a wireless communications adapter according to one embodiment of the present subject matter. In the embodiment shown, the indicator light is separate from the button. Multiple colored lights may be employed to provide various status information from a single indicator opening. Other arrangements are possible without departing from the scope of the present subject matter.

FIG. 9 shows a back view of one example of a wireless communications adapter according to one embodiment of the present subject matter. The contacts for charging in embodiments including rechargeable batteries are shown. Other arrangements are possible without departing from the scope of the present subject matter.

Figure 10:
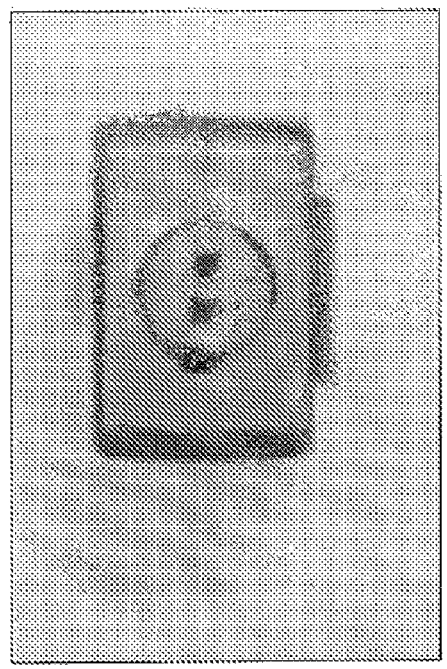
FIG. 10 shows a top view of one example of a wireless communications adapter according to one embodiment of the present subject matter.

FIG. 10 shows a top view of one example of a wireless communications adapter according to one embodiment of the present subject matter. In the embodiment shown, the DAI connector can swivel to provide varying angles of the wireless communications adapter with respect to the device it is connected to. Other arrangements are possible without departing from the scope of the present subject matter.

Figure 11:
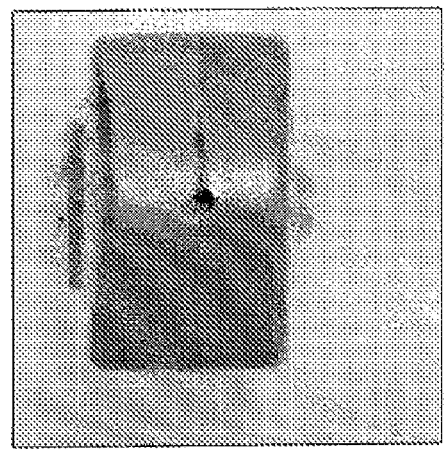
FIG. 11 shows a bottom view of one example of a wireless communications adapter according to one embodiment of the present subject matter.

FIG. 11 shows a bottom view of one example of a wireless communications adapter according to one embodiment of the present subject matter. The microphone hole is shown. Other arrangements are possible without departing from the scope of the present subject matter.

Figure 12:
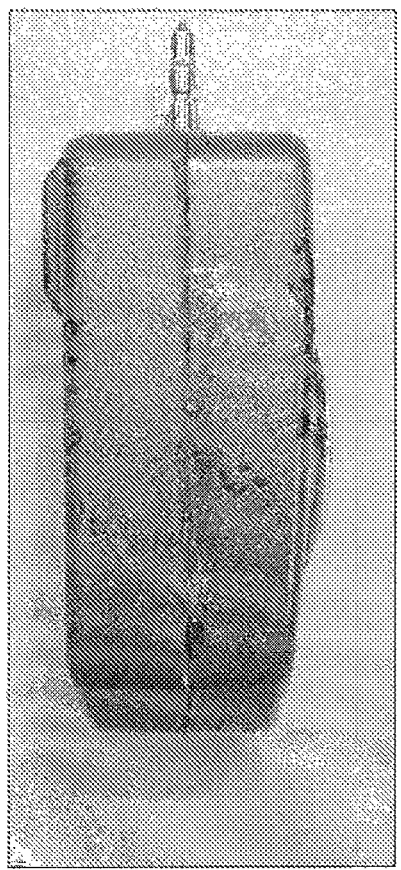
FIG. 12 shows a first side view of one example of a wireless communications adapter according to one embodiment of the present subject matter.
Figure 13:
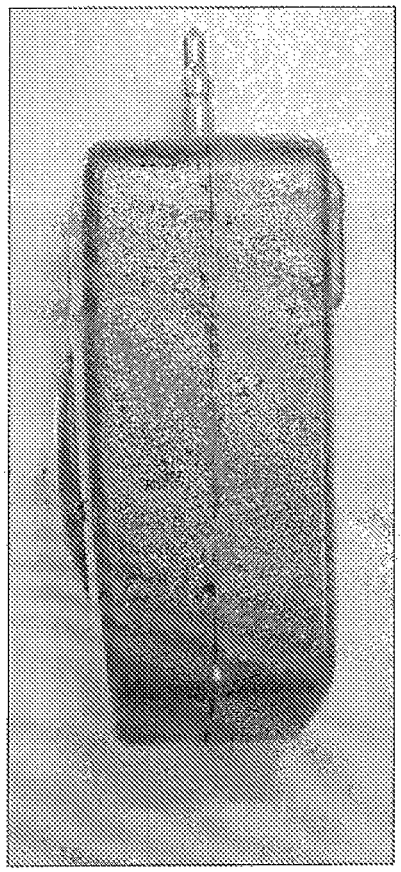
FIG. 13 shows a second side view of one example of a wireless communications adapter according to one embodiment of the present subject matter.

FIG. 12 shows a first side view of one example of a wireless communications adapter according to one embodiment of the present subject matter. FIG. 13 shows a second side view of one example of a wireless communications adapter according to one embodiment of the present subject matter. Other arrangements are possible without departing from the scope of the present subject matter.

In various embodiments, the wireless communications adapter can take on a variety of shapes and weights. For one example, the wireless communications adapter is in an almond shape with length of about 27 mm, width of about 15 mm, and thickness of about 10 mm. In one example, the case is plastic and the assembly has a weight of about 10 grams.

Various types of functions can be performed with a single button. For instance, it can be used to switch the device on and off. It can also be used for pairing or multi pairing by holding the button for a predetermined amount of time when in proximity to a device or devices to be paired with. The device can be used in conjunction with activation of voice recognition on a mobile phone. For instance, a mobile phone supporting a BLUETOOTH compatible communications mode. The button can also be used for a reconnection request (for example, after switch off/on sequence).

Volume control can be accomplished using software settings. It can also be accomplished using devices in communications with the wireless communications adapter. In embodiments having an optional volume control, the volume control can be used to adjust volume.

Some embodiments employ a dual color LED (red and blue) to state the charge, end of charge, low battery, stand-by, and other communication features.

The system can be used in conjunction with a cell phone to take a call, end a call, switch the communication on the phone, and/or switch the communication from the phone to the headset. Additional features can be supported with a with the hands free profile, such as rejection of a call, or second call waiting.

In various embodiments a dedicated sound in the speaker is provided for low battery, switch on, switch off, pairing, voice activation, reconnection request, and waiting call.

Different battery designs can be employed without departing from the scope of the present subject matter. In one example, a lithium polymer battery is used. Some such designs feature a current capacity of about 100 mA. Some such designs can be recharged in less than 2 hours when depleted.

In various embodiments, the charging circuit may include protection against overheat and shortcut and other forms of charge control.

In various embodiments the wireless communications adapter includes power management features. Such features include, but are not limited to, special designs to control the current consumption transmission auto adaptive according to the distance of the mobile, deep sleep implemented, and HV1, HV2 and HV3 (very low power consumption) depending the mobile phone.

Depending on the features provided and overall design, it is possible to construct units having a standby time of at least 300 hours and a talk time of about 3 to 4 hours. Such designs have varying power consumption. Some such designs have consumption of around 2.5 μA in standby mode, and up to 50 mA in full power. Other designs will vary.

Communications of far field signals are supported. Some embodiments employ 2.4 GHz communications. In various embodiments the wireless communications can include standard or nonstandard communications. Some examples of standard wireless communications include, but are not limited to, BLUETOOTH™, IEEE 802.11(wireless LANs) wi-fi, 802.15(WPANs), 802.16(WiMAX), cellular protocols including, but not limited to CDMA and GSM, ZigBee, and ultra-wideband (UWB) technologies. Such protocols support radio frequency communications and some support infrared communications. It is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

In some embodiments, when connected to a hearing assistance device, the speaker will use the Direct Audio Input. In one embodiment, the microphone is an omnidirectional microphone. Other embodiments having more than one sound hole are possible which employ microphones capable of directional reception. Such designs include omnidirectional and directional modes.

In various embodiments, the hardware employed is that as specified by INNOVI (Innovi Technologies Limited). Other embodiments are possible without departing from the scope of the present subject matter. Other embodiments are possible without departing from the scope of the present subject matter.

In various embodiments, the wireless communications adapter will support BLUETOOTH Mobile/Headset adapter software. For instance, some embodiments are compatible with class 2 BLUETOOTH headset operation. Other types of software can be supported. Other arrangements are possible without departing from the scope of the present subject matter.

In various embodiments the one or more buttons act as a master control. In various embodiments, the master control can turn the wireless communications adapter on and off, pair it with a cell phone or other devices, answer incoming calls, reject incoming calls, and hang up on calls.

Various forms of data can be communicated. For example, data such as voice data, streaming audio data, application data, and/or functional parameters, may be communicated with such a configuration. Other forms of data may be communicated without departing from the scope of the present subject matter.

It is understood one of skill in the art, upon reading and understanding the present application will appreciate that variations of order, information or connections are possible without departing from the present teachings.

Additionally, one of ordinary skill in the art will understand that, the systems shown and described herein can be implemented using software, hardware, and combinations of software and hardware. As such, the term "system" is intended to encompass software implementations, hardware implementations, and software and hardware implementations.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments and other embodiments will be apparent to those of skill in the art upon reviewing the above description. The scope of the present subject matter should be determined with reference to the appended claims, along with the full scope of equivalents to which such claims are entitled.

What is claimed is:

1. An apparatus adapted to connect to a hearing assistance device, comprising:
   a connector adapted to electrically connect to the Direct Audio Input (DAI) connector of the hearing assistance device, wherein the connector is adapted to adjustably position the apparatus with respect to the device;
   a controller adapted to communicate with the DAI connector;
   wireless communication electronics adapted for radio frequency communications and for communication with the controller;
   a power source providing power to the apparatus, and
   a housing for the controller, the wireless communication electronics, and the power source, the housing adapted to accommodate the connector,
   wherein the apparatus is adapted to be compact, portable, and to connect to the hearing assistance device using the Direct Audio Input (DAI) connector of the hearing assistance device.

2. The apparatus of claim 1, wherein the apparatus includes a microphone connected to the controller.

3. The apparatus of claim 2, including a boom connected to the housing and extending from the housing to a distal end, the microphone located about the distal end.

4. The apparatus of claim 1, wherein the wireless communication electronics are adapted for communications compatible with a BLUETOOTH standard.

5. The apparatus of claim 1, including one or more indicators which indicate an operative mode and a non-operative mode.

6. The apparatus of claim 5, comprising one of the one or more indicators adapted to indicate establishment of radio frequency communication.

7. The apparatus of claim 5, comprising one of the one or more indicators adapted to represent a powered mode.

8. The apparatus of claim 1, wherein the wireless communication electronics operate at approximately 2.4 GHz.

9. The apparatus of claim 1, wherein the apparatus is adapted for operation compatible with class 2 BLUETOOTH headset operation.

10. The apparatus of claim 1, including a switch adapted for switching the wireless communication electronics between a power-off mode and a power-on mode.

11. The apparatus of claim 1, including a switch adapted for answering a telephone call.

12. The apparatus of claim 1, including a switch adapted for terminating a wireless connection to a remote device.

13. The apparatus of claim 1, including a switch adapted for pairing the wireless communication electronics with a remote device.

14. The apparatus of claim 1, including a switch adapted for pairing the wireless communication electronics with a plurality of remote devices.

15. The apparatus of claim 1, wherein the wireless communication electronics are programmed for unidirectional radio frequency communications.

16. The apparatus of claim 1, wherein the wireless communication electronics are programmed for bidirectional radio frequency communications.

17. An apparatus, comprising:
   a connector electrically connected to the Direct Audio Input (DAI) connector of a behind-the-ear hearing assistance device, wherein the connector is adapted to adjustably position the apparatus with respect to the device;
   a controller adapted to communicate with the DAI connector;
   wireless communication electronics adapted for bidirectional radio frequency communications according to a BLUETOOTH wireless protocol and for communication with the controller;
   a power source providing power to the apparatus, and
   a housing for the controller, the wireless communication electronics, and the power source, the housing adapted to accommodate the connector and to accommodate a button for controlling the apparatus,
   wherein the apparatus is adapted to be compact and portable and is adapted to connect to the Direct Audio Input (DAI) connector of the behind-the-ear hearing assistance device.

18. The apparatus of claim 17, further comprising a button adapted to manage cellular telephone connections between the apparatus and a cellular telephone using the BLUETOOTH wireless protocol.

19. A method, comprising:
   connecting a wireless communication adapter to the Direct Audio Input (DAI) connector of a hearing assistance device, including adjustably positioning the adapter with respect to the device; and
   conducting communications involving a remote wireless device using the wireless communication adapter connected to the hearing assistance device.

20. The method of claim 19, wherein the communications comprise telephone communications.

* * * * *